United States Patent
Pusdesris et al.

(10) Patent No.: US 11,663,132 B2
(45) Date of Patent: May 30, 2023

(54) PREFETCHING

(71) Applicant: Arm Limited, Cambridge (GB)

(72) Inventors: Joseph Michael Pusdesris, Austin, TX (US); Jacob Martin Degasperis, Austin, TX (US); Alexander Cole Shulyak, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/500,309

(22) Filed: Oct. 13, 2021

(65) Prior Publication Data

US 2023/0110541 A1    Apr. 13, 2023

(51) Int. Cl.
| | |
|---|---|
| *G06F 12/00* | (2006.01) |
| *G06F 12/0862* | (2016.01) |
| *G06F 12/02* | (2006.01) |
| *G06F 12/1027* | (2016.01) |
| *G06F 12/0811* | (2016.01) |

(52) U.S. Cl.
CPC ...... *G06F 12/0862* (2013.01); *G06F 12/0238* (2013.01); *G06F 12/0811* (2013.01); *G06F 12/1027* (2013.01)

(58) Field of Classification Search
CPC ............. G06F 12/0862; G06F 12/0238; G06F 12/0811; G06F 12/1027
See application file for complete search history.

(56) References Cited

U.S. PATENT DOCUMENTS

| | | | |
|---|---|---|---|
| 8,397,049 B2* | 3/2013 | Wang | G06F 12/1027 |
| | | | 711/E12.078 |
| 9,582,282 B2* | 2/2017 | Hayenga | G06F 12/0862 |
| 2020/0133863 A1* | 4/2020 | Pusdesris | G06F 12/0862 |

* cited by examiner

*Primary Examiner* — Shawn X Gu
(74) *Attorney, Agent, or Firm* — Nixon & Vanderhye P.C.

(57) ABSTRACT

A technique is provided for prefetching data items. An apparatus has a storage structure with a plurality of entries to store data items. The storage structure is responsive to access requests from processing circuitry to provide access to the data items. The apparatus has prefetch circuitry to prefetch data and correlation information storage to store correlation information for a plurality of data items. The correlation information identifies, for each of the plurality of data items, one or more correlated data items. The prefetch circuitry is configured to monitor the access requests from the processing circuitry. In response to detecting a hit in the correlation information storage for a particular access request that identifies a requested data item for which the correlation information storage stores correlation information, the prefetch circuitry is configured to prefetch the one or more correlated data items identified by the correlation information for the requested data item.

18 Claims, 9 Drawing Sheets

PREFETCHING

BACKGROUND

The present technique relates to the field of data processing. More particularly, the present technique relates to prefetching.

Prefetching is a technique whereby data that is expected to be accessed from a storage structure is pre-emptively fetched into the storage structure so that the data is available when it is requested. This can improve the performance of accesses to the storage structure since, by anticipating the data for which access will be sought, the storage structure can be populated with that data before the access is actually requested. This can reduce a potential delay in fetching the data into the storage structure following an access request. Prefetching may for example be used within a cache hierarchy to prefetch data from a higher level of cache (further from processing circuitry) into a lower level of cache (closer to the processing circuitry) in advance of that data being accessed by the processing circuitry. Thus, when an access request is made for that data, the data is stored in a cache closer to the processing circuitry and so can be accessed more quickly.

SUMMARY

In one example arrangement, there is provided an apparatus comprising: a storage structure comprising a plurality of entries to store data items, wherein the storage structure is responsive to access requests from processing circuitry to provide access to the data items; prefetch circuitry to prefetch data; and correlation information storage to store correlation information for a plurality of data items identifying, for each of the plurality of data items, one or more correlated data items; wherein the prefetch circuitry is configured to: monitor the access requests from the processing circuitry; and in response to detecting a hit in the correlation information storage for a particular access request that identifies a requested data item for which the correlation information storage stores correlation information, prefetch the one or more correlated data items identified by the correlation information for the requested data item.

In another example arrangement, there is provided a method of managing a storage structure: storing data items in the storage structure, the storage structure comprising a plurality of entries; providing access to the data items in response to access requests from processing circuitry; storing correlation information for a plurality of data items identifying, for each of the plurality of data items, one or more correlated data items; monitoring the access requests from the processing circuitry; in response to detecting a hit in the correlation information storage for a particular access request that identifies a requested data item for which the correlation information storage stores correlation information, prefetching the one or more correlated data items identified by the correlation information for the requested data item.

In a yet further example arrangement, there is provided a non-transitory computer-readable medium to store computer-readable code for fabrication of an apparatus comprising: a storage structure comprising a plurality of entries to store data items, wherein the storage structure is responsive to access requests from processing circuitry to provide access to the data items; prefetch circuitry to prefetch data; and correlation information storage to store correlation information for a plurality of data items identifying, for each of the plurality of data items, one or more correlated data items; wherein the prefetch circuitry is configured to: monitor the access requests from the processing circuitry; and in response to detecting a hit in the correlation information storage for a particular access request that identifies a requested data item for which the correlation information storage stores correlation information, prefetch the one or more correlated data items identified by the correlation information for the requested data item.

BRIEF DESCRIPTION OF THE DRAWINGS

Further aspects, features, and advantages of the present technique will be apparent from the following description of examples, which is to be read in conjunction with the accompanying drawings, in which.

DESCRIPTION OF EXAMPLES

Figure 1:
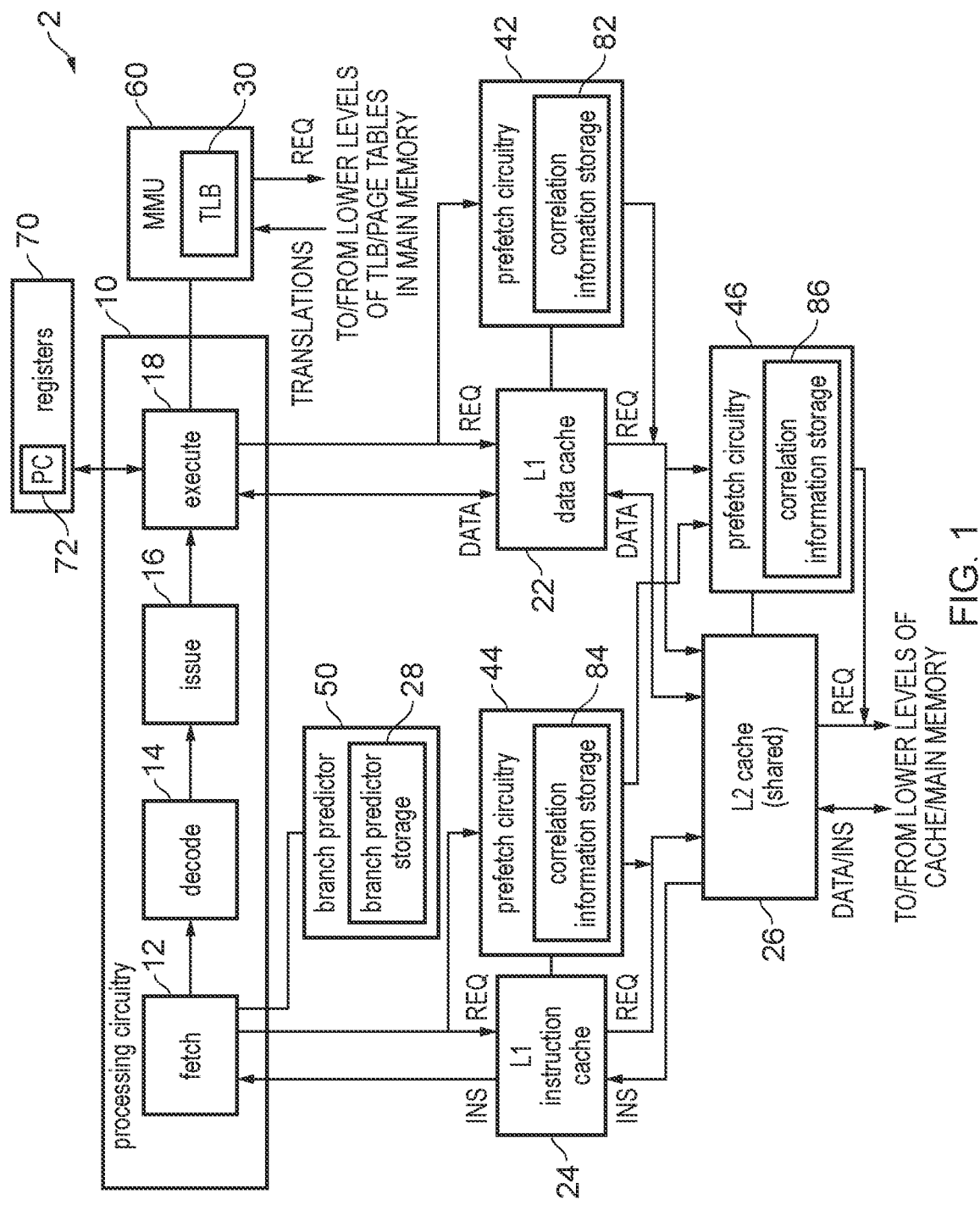
FIG. 1 is a block diagram of a system in which the techniques described herein may be employed.

Before discussing the embodiments with reference to the accompanying figures, the following description of embodiments is provided.

Various techniques may be used for performing prefetching. One such technique is stride prefetching in which the prefetcher is configured to identify access requests to memory addresses having a fixed offset from each other. Based on identifying the memory accesses having this offset, the prefetcher can begin to prefetch further addresses differing by that offset, based on the assumption that the memory accesses will continue to follow the same pattern differing by the constant offset. Other forms of prefetching similarly monitor the pattern of accesses and based on the pattern of memory addresses observed, predict to which memory addresses access will be sought if the pattern continues.

However, such prefetching techniques are unsuitable for certain forms of workload and will not be able to accurately prefetch the data for which access is sought. One example of such a workload involves traversing through a linked list. In a linked list, each node comprises an address of the next node in the list as well as any data associated with that node. In general, there is no requirement that nodes of the linked list be sequentially located in memory or that the nodes have a constant offset. As such, prefetchers that rely on observing patterns of access and predicting that the patterns will continue typically perform poorly at prefetching such workloads.

Another form of prefetching, temporal prefetching, is however much better at predicting the pattern of accesses of workloads such as traversing a linked list. With temporal prefetching, correlation information (also referred to as metadata) is maintained to record the pattern of accesses observed. The correlation information is indicative of previously observed sequences of memory accesses and so, in response to detecting a memory access of that sequence, the temporal prefetcher can prefetch the rest of the sequence. Temporal prefetching therefore involves the collection and maintenance of correlation information and manages to prefetch workloads for which upcoming accesses could not be predicted solely from the patter of preceding accesses. For the example of the linked list therefore, on a first pass of the linked list, correlation information would be stored identifying a sequence of memory accesses corresponding to the nodes of the linked list. Thereafter, on detection of a memory request to one of the nodes of the linked list, the correlation information for that series of accesses can be identified by the prefetcher and the subsequent nodes of the linked list prefetched. It will be appreciated that the linked list is an example of workload to which a temporal prefetcher is particularly well suited and that the temporal prefetcher may be used for other forms of workload and in particular those having no spatial pattern across a memory address space but instead having an irregular but repeated pattern of accesses.

In accordance with the techniques described herein, there is provided a temporal prefetcher that operates in response to access requests received directly from processing circuitry. The prefetcher monitors the access requests that are issued from the processing circuitry itself to the storage structure. This is in contrast to techniques in which a prefetcher monitors requests coming from a cache. Given the number of access requests that can be produced by processing circuitry, typically prefetchers monitor only the access requests arising as a result of cache misses. In this way, the cache acts to filter the access requests that need to be monitored by the prefetcher since any access requests for which the cache already stores the data item will not lead to a cache miss and so not produce a request to a higher level of cache/main memory for the prefetcher to handle.

However, by operating in response to the access requests from the processing circuitry itself, the present techniques are able to provide temporal prefetching for storage structures directly coupled to the processing circuitry from which the access requests arise (e.g., a level 1 (L1) cache). Given the proximity of such storage structures to the processing circuitry, accurate prefetching into such storage structures can significantly improve the performance with which memory accesses are handled. Moreover, the prefetcher has visibility of all of the access requests coming from the processing circuitry and so can prefetch proactively based on the access requests even if that access request leads to a hit in the storage structure, rather than needing to wait for a miss before the prefetcher can prefetch the next data item.

Additionally, by monitoring the access requests from the processing circuitry, the prefetcher may be presented with more information from which to make the determination as to whether prefetching should be carried out. For example, where each entry of the storage structure stores more than one data item (e.g., multiple data items in a cache line), the prefetcher may be able to monitor to which of the data items in the entry the access is directed and make use of this information in prefetching, whereas a prefetcher watching only the requests originating from the storage structure occurring as a result of misses in the storage structure would only see the entry (e.g., the cache line) and not the data item itself that was requested causing that entry to be requested. Hence, more accurate prefetching can be performed, reducing the likelihood that an entry will be erroneously prefetched leading to displacement of an existing data item in the storage structure.

In accordance with the techniques described herein, there is provided an apparatus comprising a storage structure. The storage structure comprises a plurality of entries to store data items. In some examples, the storage structure is a cache such as a data cache to store cached versions of data used by the processing circuitry or an instruction cache to store cached versions of instructions to be executed by the processing circuitry. The storage structure could also be a translation lookaside buffer (TLB), branch predictor storage, or indeed a metadata storage structure for a prefetcher. The storage structure is responsive to access requests received from the processing circuitry. The access request may for example be triggered by execution of a load instruction and be a request to load a particular data item into a register of the processing circuitry, or may for example be triggered by a store instruction and be a request to store a particular data item in the storage structure. The access request could also take other forms and need not be triggered directly by execution of an instruction.

The apparatus further comprises prefetch circuitry to prefetch data. The prefetch circuitry operates in conjunction with correlation information storage that stores correlation information for a plurality of data items. Since the correlation information storage may be referenced frequently (e.g., several times per clock cycle) as the access requests are produced by the processing circuitry, the correlation information storage may be implemented on-chip in close proximity to the prefetch circuitry and the processing circuitry. For example, dedicated storage may be provided to store the correlation information or the correlation may be stored in the storage structure itself, with entries of the storage structure repurposed for the storage of this correlation information.

The correlation information storage stores correlation information for a plurality of data items, however, not all data items stored in the storage structure or more generally accessible to the processing circuitry (e.g., stored in higher levels of cache/main memory) may have correlation information in the correlation information storage. Rather, the correlation information storage may maintain only the correlation information perceived to be most relevant, for example, by implementing a replacement policy to select the least relevant (e.g., the least-recently used) correlation information to be removed from the correlation information storage when new correlation information is allocated.

For each of the plurality of data items for which correlation information is stored, the correlation information storage identifies one or more correlated data items. These correlated data items represent data items to be prefetched when the data item associated with them (also referred to as a trigger data item) is encountered. In this way, the correlation information indicates for the trigger data items, the one or more correlated data items that are expected to be accessed following the access to the trigger data item.

As such, when monitoring the access requests from the processing circuitry, if the prefetch circuitry detects a hit in the correlation storage, where a hit represents an access request identifying a requested data item matching the trigger data item for an entry in the correlation information, the one or more correlated data items are prefetched. Thus, the correlation information representing knowledge of correlated data items (e.g., due to previously observed sequences of accesses) can be used to inform which data items are prefetched. If the subsequent access requests received from the processing circuitry follow the sequence represented by the trigger data item and its associated one or more correlated data items, those data items will have been prefetched and so may be available to the processing circuitry more quickly than had this prefetching operation not been performed. Hence, prefetching the data items in this way can reduce the time taken to handle the access requests from the processing circuitry, thereby improving the performance of the storage structure and/or the hierarchy of storage structures in which the storage structure is situated.

As discussed above, the correlation information identifies, for each trigger data item of the plurality of data items, one or more correlated data items. In some examples therefore, the correlation information storage is configured to store correlation information comprising a plurality of (i.e., two or more) correlated data items. Thus, by prefetching this plurality of correlated data items, the prefetch circuitry can even more efficiently prefetch data items than a system which is limited to prefetching only a single item since a single access can trigger prefetching of a series of data items, thereby avoiding the overhead of handling the triggering in response to every other data item encountered even when the sequence is correctly predicted.

In some examples, the determination as to whether the access requests from the processing circuitry hit in the correlation information storage is based on determining that an address specified by the access request corresponds with an address of a trigger data item. Each data item of the plurality of data items has an associated trigger address such that when a match is detected in a comparison based on the trigger address and the address specified by a particular access request, a hit is detected and the correlated data items identified by the correlation information for that address are prefetched. The comparison itself may be a comparison directly between the specified address for the access request and the trigger addresses or may be a comparison between a portion of each of the addresses such as the most significant bits. For example, the bits of the addresses that identify an entry in the storage structure may be compared even where the addresses themselves may identify a particular data item within that entry to which access is sought. In some examples, a hash may first be calculated for the addresses or portions thereof and the hashes compared in the comparison. Thus, whilst in rare cases a false match could be detected when two different addresses share the same hash, the amount of space required for storing trigger addresses in the correlation information storage can be reduced and/or the time required to perform the comparison reduced.

The prefetch circuitry may be configured to reference the correlation information storage for every access request that is observed from the processing circuitry. However, in some examples a filter is first applied to reduce the rate at which the correlation information storage has to be referenced. This filtering technique may take into account an expected likelihood of a hit being detected such that accesses that are less likely to have correlation information stored for them are preferentially filtered out and so not monitored.

The correlation information storage may be directly mapped such that the location at which an item of correlation information is stored can be determined solely from the address. Thus, when determining whether correlation information is stored for a particular access request, only one location in the correlation information storage needs to be checked. However, in some examples, a set-associative structure is used for storing the correlation information. For such a set-associative structure, an index portion of the address specified by the access request is used to identify which set of a plurality of sets in the correlation information storage corresponds to that address. The set may contain multiple items of correlation information. A tag portion of the specified address is then compared against a tag associated with the items of correlation information in the identified set. If a match is detected in the comparison (which may be based on hashes or the addresses themselves) of the tag portion of the specified address and the tags of the correlation information, then a hit is detected and there is correlation information stored for the specified address. However, if no match is detected in this comparison, then a hit is not detected and the prefetch circuitry does not have correlation information on which to base a prefetch.

The storage structure may be arranged to store two or more data items in an entry of the storage structure. This may be the case where the storage structure is a cache and the entry is a cache line containing more than one data item. For example, a 64 byte cache line may be used, containing two 32 byte words. The storage structure may therefore be responsive to access requests that specify a particular data item of an entry to which access requests are directed. That is, the processing circuitry specifies in the access request which of the data items of an entry is requested using the trigger address. In contrast to approaches that monitor access requests that do not include this information (such as the access requests coming from a cache which may relate to entire cache lines and do not specify a particular data item of that cache line), this approach allows greater visibility of the data item to which the access is directed.

To make use of this information and provide more accurate prefetching, the correlation information storage stores correlation information relating specifically to data items of an entry. This correlation information could therefore be distinct from separate correlation information stored in the correlation information storage for the same entry of the storage structure, but for a different data item in that entry. The prefetch circuitry is configured to detect a hit in response to determining that the particular data item identified by the access request corresponds to the data item for which the correlation information storage stores correlation information. This could be done by comparing (or performing a comparison based on) the entire address specified by the access request. In contrast to an approach in which only a most significant portion of the addresses are compared, by basing the comparison (which may involve comparing hashes rather than the addresses themselves) on the entire address, patterns of accesses involving the same entry (e.g., cache line) but different data items can be distinguished. Returning to the example of a linked list, this therefore allows two linked list with different nodes in the same cache line to be prefetched in a different way, corresponding to that particular linked list, rather than reaching the node in the shared cache line and prefetching the subsequent nodes for the wrong linked list. It will be appreciated that these techniques apply beyond just linked lists and may be used with other temporally (or otherwise) correlated accesses.

Another factor that may be used to determine whether an item of correlation information is to be used as the basis for a prefetch is a comparison based on the program counter value. The processing circuitry may maintain a program counter to identify the next instruction to be executed. The value of the program counter when an instruction is executed is therefore indicative of a current position in program flow. The inventors recognised that correlated patterns of memory accesses are often associated with loops of code and so execution of the same instruction will cause the pattern of accesses for which correlation information can be stored and used to perform prefetching. Thus, even when another different instruction accesses the same data item, the pattern of accesses following the access may not be expected to be the same as for the first instruction. Therefore, to take into account the instruction that triggered the access request, the correlation information storage is arranged to store correlation information tagged by a program counter value. With the program counter value (or a hash thereof) stored and used to identify the items of correlation information in the correlation information storage, detecting a hit by the prefetch circuitry is additionally subject to detecting a match in a comparison based on the value of the program counter for an instruction that triggered the particular access request and the program counter value for correlation information of a data item. This comparison may be a direct comparison between the program counter values or portions of the program counter values, or may be a comparison of values derived from the program counter values, e.g., a hash calculated on the basis of the program counter values.

In contrast to approaches which involve monitoring the access requests coming from a storage structure itself which may specify only the entry (e.g., cache line) requested for the storage structure, by monitoring accesses coming from the processing circuitry itself, the program counter value of the processing circuitry can be observed by the prefetch circuitry and used both for generating the correlation information including the program counter value and in the comparison to determine whether correlation information is stored that is relevant to a particular access request and so to determine whether a prefetch should be carried out. Monitoring the program counter values may not be suitable or even possible in a system which does not monitor the accesses directly from the processing circuitry. This is firstly because it may not possible to determine the program counter value for accesses propagated to higher levels of a storage structure hierarchy. Additionally, by monitoring only accesses coming from a lower level of storage structure, the accesses that are observed are only the accesses leading to a miss in the storage structure. Hence, if two different accesses from the processing circuitry access the same entry in the storage structure, it may be that only one of these will result in a cache miss and so be observed.

In some examples, this comparison based on the program counter values as described above is performed in combination with a comparison based on the particular data item to which the access request is directed. These comparisons may be combined such that a single comparison occurs between a hash of the address and the program counter value. In such examples, the hash of the address (which may include all bits of the address) and program counter value is used to identify the correlation information in the correlation information storage. In response to an access request from the processing circuitry, the hash of the address specified by the access request and the program counter value of the processing circuitry associated with the request is calculated and the correlation information storage referenced to determine whether correlation information is stored for that address and program counter value. This may provide a particularly accurate approach to prefetching by distinguishing between patterns of accesses involving different data items within the same entry in the storage structure and different instructions triggering the accesses. This may be useful where it is recognised that such differing patterns of accesses are not expected to be correlated even though they involve the same entry of the storage structure.

In some examples, the prefetch circuitry is configured to prefetch the data into the storage structure itself and so prefetching the one or more correlated data items comprises prefetching the one or more correlated data items into the storage structure. This may be the case where the storage structure is an L1 cache and so the access requests to the storage structure are monitored in order to control prefetching into that L1 cache. However, in some examples, the apparatus comprises a second storage structure into which the data is prefetched and so prefetching the one or more correlated data items comprises prefetching the one or more correlated data items into the second storage structure. In such examples, the storage structure may be a storage structure at a different level in a hierarchy, such as a level 2 (L2) cache in a cache hierarchy. However, monitoring the access requests from the L1 cache to the L2 cache may mean that only access requests corresponding to cache misses from the L1 cache can be observed by the prefetch circuitry. Similarly, if the prefetch circuitry were to monitor only the requests to the L2 cache, the program counter value and the particular data item (rather than the entire cache line) to which the access is directed could not be observed. Hence, the apparatus may provide prefetching into a second storage structure (such as the L2 cache) on the basis of accesses observed from the processing circuitry to the storage structure (e.g., the L1 cache).

As discussed above, the prefetch circuitry may prefetch the correlated data items identified by the correlation information into the storage structure itself or may in some cases prefetch the data items into a different storage structure. In some examples, in addition to this prefetching, be it into the storage structure or the second storage structure, the prefetch circuitry is configured to trigger a prefetch into a translation lookaside buffer (TLB) of one or more translation entries for performing address translation for the correlated data items. That is, in an apparatus comprising a TLB to store address translation data, the processing circuitry may generate access requests specifying a virtual address of the data items that are requested. To translate this virtual address into an address used by the storage structure to identify the data items, translation data may be referenced. The TLB stores cached versions of this translation data so that page tables in main memory storing the translation data do not need to be referenced for each translation. However, the absence of the relevant translation in the TLB can cause delays in the accessing of data items since the translation data may need to be obtained from a higher level of TLB or from main memory before the translation can be carried out and the access request handled. Since a page table walk to find translation data can take a significant amount of time, proactively prefetching translation data that is expected to be needed into the TLB can improve the performance of handling the access requests. Thus, when a hit is detected in the correlation information storage for a particular access request, and so the correlation information indicates expected upcoming accesses, the prefetch circuitry can trigger a prefetch not only of the data items themselves but also of translation entries for the one or more correlated data items into the TLB.

The correlation information storage could be populated in a number of ways, however, in some examples, correlation entries are added to the correlation information storage in response to the access request missing in the storage structure. That is, when a data item specified by an access request is not present in the storage structure and so the data item was not prefetched by the prefetch circuitry, the prefetch circuitry may be arranged to add a correlation entry to the correlation information so that the pattern of accesses observed following that data item may be prefetched next time that data item is encountered. That is, a correlation entry is added for the data item specified by the missing access request (which may identify the address and the program counter value of the request), the correlation entry identifying, as the one or more correlated data items, one or more subsequent data items accessed following the missing access request. In this way, the apparatus is able to learn from the pattern of data accesses encountered such that the prefetch circuitry can prefetch the sequence of data items accessed next time that sequence is encountered.

Since space in the correlation information storage may be limited, a replacement policy may be imposed in order to determine, when new correlation information is allocated into the correlation information storage, which correlation information should be removed in order to make space for the new correlation information. A number of possible replacement policies could be used, but in some cases, an indication of the least recently used piece of correlation information (in a particular set where the correlation information storage is set-associative or overall where the correlation information storage is fully-associative) is maintained, and the least recently used piece of correlation information (in the set to which the new correlation information belongs for a set-associative correlation information storage) is replaced with the new correlation information. In other examples, to implement the replacement policy, a counter is maintained for each entry in the correlation information storage to count the number of attempted allocations to the given entry. At a certain value, this counter saturates, which used to indicate an entry that is susceptible to being replaced. On an attempted allocation to an entry for which the counter is not saturated, the allocation is dropped, the existing content in the entry maintained, and the counter incremented. However, on an attempted allocation to an entry for which the counter is saturated, the content is replaced and the counter reset to 0. This may for example be used in a structure that is direct-mapped (each piece of correlation has only one entry in which it could be allocated).

In some examples, the apparatus is provided with several prefetch mechanisms tailored to different types of prefetching. For example, in addition to the prefetch circuitry that implements a temporal prefetcher as discussed, the apparatus may be provided with a stride prefetcher and/or a stream buffer prefetcher to prefetch blocks of data corresponding to subsequent memory addresses following the address of an observed access request.

Since the amount of space available for storing the correlation information may be limited, particularly where the correlation information is stored on-chip (which may particularly be the case since the correlation information is referenced frequently), the prefetch circuitry may be configured to suppress the addition of new correlation information to the correlation information storage where it is determined that one or more of the other prefetch mechanisms are capable of prefetching the one or more subsequent data items. That is, if the prefetch circuitry identifies that the temporal prefetcher could be used to prefetch a particular workload, but that workload could also be prefetched by another prefetch mechanism of the apparatus, correlation information for that workload may not be stored and the prefetching left to the other prefetch mechanisms, so as to save space in the correlation information storage for correlation information relating to workloads to which the other prefetch mechanisms are not suited.

In some examples, to improve the use of the available space in the correlation information storage, the indication of the one or more correlated data items is compressed, thereby making it possible for correlation information relating to more trigger data items to be stored than if compression was not used.

There are a number of ways in which compression can be achieved. However, in some examples, the correlated data items are compressed by storing a base address and, for each correlated data item, a delta between the base address and an address of the correlated data item. In some examples, the base address comprises common bits between the correlated data items and the delta comprises remaining bits from the addresses of the correlated data items when the common bits are removed. The address can be decompressed by concatenating the delta with the common bits. As an alternative, the delta could be an offset from the base address (e.g., achieved via subtraction), with leading zeros (or ones) removed. However, such examples could provide a variable number of deltas for a single item of correlation information. In some examples, an offset could be calculated using a binary operator such as a XOR and again by removing leading zeros (or ones). Other options will be known to the skilled person.

The correlation information storage could be implemented in a number of ways. For example, the correlation information could be stored off-chip and accessed when needed, however, given the potential frequency of access required to the correlation information to reference every access request coming from the processing circuitry, on-chip storage may be preferable. Such on-chip storage could involve making use of the storage structure itself with storage entries in the storage repurposed to store correlation information. The storage structure may therefore be adapted to treat one or more of the plurality of entries in the storage structure as correlation storage entries to store the correlation information. Whilst this approach avoids the need to additionally provide a dedicated correlation information storage structure, the storage structure itself may need to be adapted to handle the correlation information differently to other information in the storage structure, e.g., by making use of a separate replacement policy for the correlation information.

In some examples, however, dedicated correlation information storage circuitry is provided as part of the apparatus, with this correlation information storage circuitry implementing the correlation information storage. By providing dedicated circuitry in this way as part of the apparatus, the correlation information storage circuitry can be located such that the correlation information may be accessed quickly in response to access requests from the processing circuitry and the storage structure itself need not be modified to handle correlation information being stored therein.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc.

An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 is a block diagram of an apparatus 2 in which the techniques described herein may be employed. FIG. 1 depicts processing circuitry 10 provided for executing instructions. The processing circuitry 10 is coupled to main memory via a cache hierarchy consisting of multiple levels of cache 22, 24, 26. In this example, a separate L1 data cache 22 and L1 instruction cache 24 are provided, both coupled to a shared L2 cache 26. The processing circuitry 10 may issue requests specifying an address of content that is required by the processing circuitry 10. The content may comprise instructions to be executed by the processing circuitry 10 and/or data values to be manipulated by the processing circuitry 10 when executing those instructions. The processing circuitry 10 has a fetch stage 12 that seeks to fetch from memory instructions that will be required to be executed by the processing circuitry 10. The fetch stage 12 has access to branch prediction circuitry in the form of branch predictor 50 to predict the instruction flow through a computer program, and hence predict which instructions should be fetched next. The branch predictor 50 makes use of branch prediction storage 28 to store data used in predicting branch information such as whether branches will be taken/not taken and the target addresses of those branches. The fetch stage 12 will typically fetch blocks of instructions at a time, with reference to an address output in a fetch request, and those fetch requests will be issued to the L1 instruction cache 24.

Similarly, an execute stage 18 of the processing circuitry 10 will issue access requests specifying an address to the L1 data cache 22, for example to request data be written from the registers 70 to the memory or to request that data be loaded into the registers 70. When a request specifying an address is issued from the processing circuitry 10, a lookup operation is performed within the L1 data cache 22 to determine whether that address matches an address of a data item stored within the L1 data cache 22, and if so the data item can be returned to the processing circuitry 10.

In the event of a miss within the L1 data cache 22, then the L1 data cache 22 can propagate the request onto the shared L2 cache 26, causing a lookup operation to be performed within the L2 cache 26 to determine whether the required data are present therein. If so, then the data identified by the request address can be returned to the L1 data cache 22 for onward propagation back to the processing circuitry 10. Those retrieved data from the L2 cache 26 will typically be allocated into a cache line in the L1 cache 22, in addition to being propagated back to the processing circuitry 10.

Similarly, if a hit is not detected within the L2 cache 26 based on the request, then the request can be propagated on to any other additional levels of cache in the cache hierarchy, and in the absence of a hit being detected in any such levels of cache, then the request can be propagated on to main memory in order to retrieve from main memory the data requested. The instructions can then be propagated back through the cache hierarchy for provision to the processing circuitry 10.

Although the operation of the L1 data cache 22 operating in response to a request for data from the execute stage 18 has been discussed in detail, it will be appreciated that similar techniques may be applied by the L1 instruction cache 24 operating in response to requests for instructions from the fetch stage 12 of the processing circuitry 10.

Prefetch circuitry 42, 44, 46 is provided in association with the caches 22, 24, 26 to monitor the requests from the processing circuitry 10 and apply prediction mechanisms to seek to predict which content will be requested at some point in the future. The prefetch circuitry 42, 44 thus monitors the access requests being received by the associated cache 42, 44, however, for the prefetch circuitry 46 associated with the L2 cache 26, in accordance with the techniques described herein, the prefetch circuitry 46 monitors the access requests issued by the processing circuitry 10 and so this may not correspond directly to the accesses received by the L2 cache 26. In some cases though the prefetch circuitry 46 for the L2 cache 26 may also monitor the requests to the cache 26 from the L1 caches 22, 24. The prefetch circuitry 42, 44, 46 makes use of correlation information storage 82, 84, 86 to store data representative of the observed patterns in the addresses associated with a series of requests and is referenced to predict the addresses of content that will be requested.

The prefetch circuitry associated with each cache can monitor the access requests from the processing circuitry 10 in order to seek to predict the future demand accesses and to then seek to prefetch content into the associated cache before such demand accesses are issued, thereby increasing hit rate with the associated cache. The operation of the prefetch circuitry 42, 44, 46 will be discussed in more detail in relation to the subsequent figures.

Instructions that are fetched by the fetch stage 12 are then passed to a decode stage 14 where they are decoded in order to produce decoded instructions (sometimes also referred to as macro operations) which are then stored within the issue stage 16. Once the source operands are available for those decoded instructions, then those decoded instructions can be passed to the execute stage 18 for execution. When executing instructions, the source operand values required may be retrieved from a register bank, and the results produced by execution of those instructions can be stored back into specified registers of the register bank. Load and store instructions can be executed in order to load data values from memory into the register bank 70, or to store data values from the register bank 70 back into the memory system. As illustrated in FIG. 1, the processing circuitry 10 maintains a program counter register 72 storing a program counter value indicative of a next instruction to be executed.

As shown in FIG. 1, when executing load or store instructions, the execution stage will interface with L1 data cache 22, and from there to one or more lower levels of cache/main memory.

In the example shown in FIG. 1, it is assumed that at the level 1 cache level of the hierarchy, there is a separate L1 instruction cache 24 and a separate L1 data cache 22. Whilst separate caches could also be used at one or more other levels, in one example arrangement all of the other levels of cache, including the L2 cache 26, may be unified caches that store both instructions and data. It will however be appreciated that other cache hierarchies even more or fewer, or differently arranged caches may be used.

The processing circuitry 10 may be arranged to refer to memory locations using virtual addresses with these virtual addresses different from the physical addresses used to refer to actual locations in main memory. Accordingly, the apparatus 2 may be provided with a memory management unit (MMU) 60 to perform address translation from virtual addresses specified by the execute stage 18 of the processing circuitry 10 to physical addresses which can be provided to the L1 data cache 22 in a request to access data. Page tables storing the translation data for converting between virtual and physical addresses are stored in main memory. However, to avoid having to reference main memory and perform a time-consuming page table walk to identify the correct item of address translation data each time a translation needs to be performed, the MMU 60 is arranged to reference a translation lookaside buffer (TLB) 30 which caches a subset of the address translation data. Although not shown in FIG. 1, an MMU and associated TLB structure may also be provided in association with the instruction fetch path to translate virtual addresses issued by the fetch stage into physical addresses.

The storage structures 28, 30, 82, 84, 86 of the branch predictor 50, MMU 60, and prefetch circuitry 42, 44, 46, respectively, may be also provided with their own prefetch circuitry (not shown) to prefetch data into those storage structures using the techniques described herein.

Figure 2:
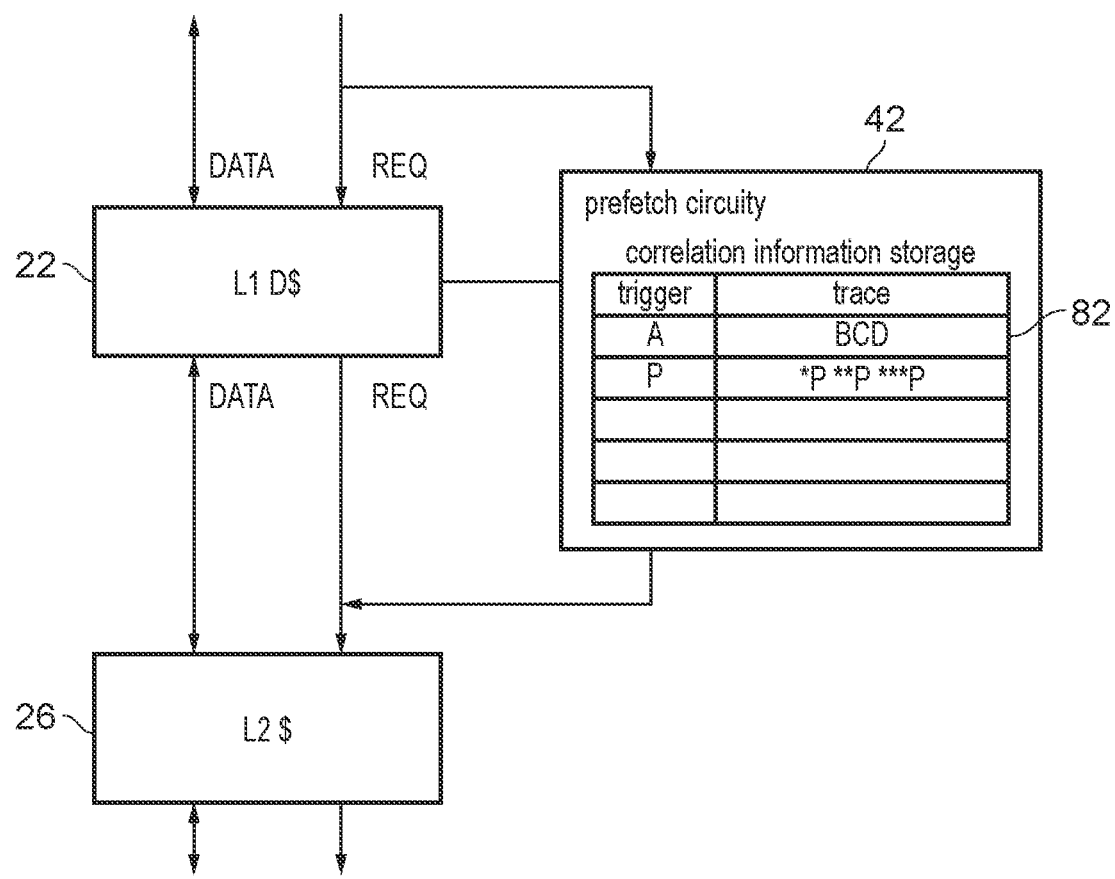
FIG. 2 is a block diagram illustrating prefetch circuitry and example correlation information in correlation information storage.

FIG. 2 is a block diagram illustrating prefetch circuitry 22 and example correlation information in correlation information storage 42. The present discussion will focus on the L1 data cache 22, however, it will be appreciated that the present techniques may be applied to the other caches 24, 26 of FIG. 1 and indeed to other storage structures 28, 30, 82, 84, 86 in the apparatus 2.

As discussed above, the L1 data cache 22 operates in response to access requests received from the processing circuitry 10. The access requests identify the data item for which access is sought and if the cache 22 stores the data item for which access is requested, the cache 22 provides access to the data item. On the other hand, if the cache 22 does not store the requested data item, the cache 22 issues a request to the L2 cache 26 for the data item which itself provides the data or requests the data from a lower level of cache/main memory. To avoid the delay in requesting the data from the lower levels of cache, prefetch circuitry 42 is provided in association with the L1 data cache 22 to pro-actively and speculatively fetch data into the cache 22 based on predicting the addresses of data items for which access will be sought.

The prefetch circuitry 42 implements a temporal prefetcher for which correlation information is stored as shown in correlation information storage 82. In this example, dedicated correlation information storage circuitry is provided to store the correlation information.

The correlation information comprises a trigger data item, as illustrated on the left of the correlation information storage and corresponding correlated data items for each trigger data item are stored. As illustrated in FIG. 2, for the trigger data item A, the correlated data items B, C, and D are identified. Thus, if the prefetch circuitry 42 monitoring the access requests from the processing circuitry 10 detects an access request to data item A, the prefetch circuitry 42 will trigger a prefetch of the data items B, C, and D from the L2 cache 26, whereupon the L2 cache 26 may itself provide the data items to the L1 data cache 22 or may need to fetch those data items from a lower level of cache/main memory. Hence, when data items B, C, and D are requested by the processing circuitry 10, they will already be present in the L1 data cache 22 and so the time taken for access to be provided by the processing circuitry 10 can be reduced as compared to having to fetch each of the data items individually as they are requested.

As further illustrated in FIG. 2, the correlation information stores for a trigger data item p, correlated data items *p, p, and *p. The operation of the apparatus, making use of these correlated data items in prefetching will be discussed with reference to FIGS. 3A-3C.

Figure 3A:
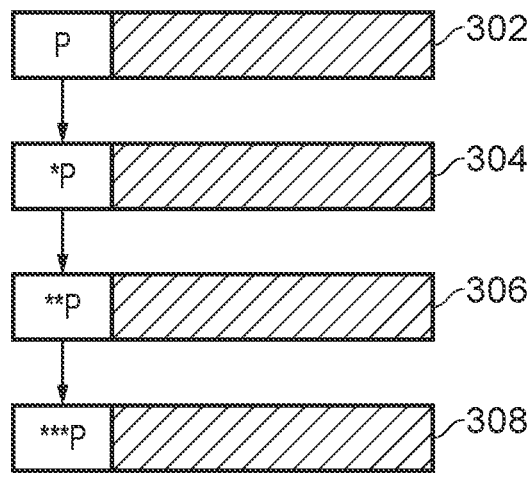
FIG. 3A shows an example arrangement of data.

FIG. 3A shows an example of a number of cache lines 302, 304, 306, 308. Each of these cache lines contains a pointer p, *p, p, *p. The pointers are arranged in a "linked-list" such that the first pointer p points to a memory address at which the second pointer *p is stored. The second pointer *p points to a memory address at which a third pointer p is stored. The third pointer p points to a memory address at which a fourth value ***p is stored. In this example, the fourth value is a data value rather than a reference to another memory location. Such a scenario could occur in a programming language such as C, where the type of "pointer" is permitted, which is a data value that refers to a location in memory where another data value (potentially another pointer) is stored. As shown in this example, each of the data values occupies its own cache line 302, 304, 306, 308. This might arise as a consequence of the use of virtual memory. In particular, even if virtual memory locations are located within close special proximity, there is no guarantee that the physical address to which those virtual addresses relate are in spatial proximity to each other. Consequently, even though the virtual addresses may be close together, each of the physical addresses could be located in distinct cache lines.

Figure 3B:
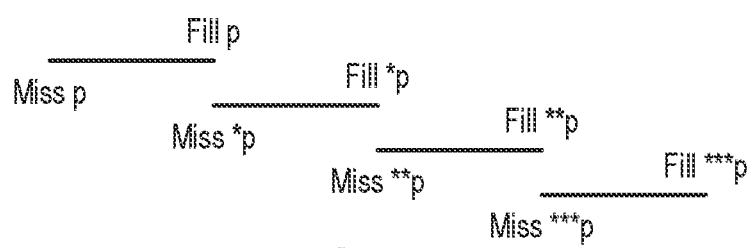
FIGS. 3B-3C show example timelines for fetching the data of FIG. 3A.

FIG. 3B is a timeline that shows the time taken for each of the data values p, *p, p, *p to be handled in a situation where each of those values is initially stored in a main memory. This situation could arise, for instance, where prefetching for these values has failed (e.g., the first time that the linked list is encountered). Initially, the first cache line 302 containing the first pointer p is fetched from memory. Once this is retrieved, a cache fill operation occurs. The value p is then analysed and it is determined that the value p is a pointer to a second data value in a second cache line 304. Since the second data value *p has not been prefetched, this must again be fetched from memory. This again takes a period of time, and a second fill operation on the retrieved data value *p takes place. This is again analysed and determined to be another pointer. Accordingly, another retrieval from memory must take place, after which a third fill operation on the data fill p must occur. Finally, this data value is analysed and determined to be another pointer. The address that is pointed to must therefore be retrieved from memory and the fourth fill operation on the data value *p must take place. As a consequence of this sequence of actions, long memory latency occurs. In particular, in order to access the underlying data value via its sequence of pointers, it is necessary to perform a number of dereferencing operations, each of which requires an access to the main memory. If none of the data values is stored in the memory hierarchy, this requires a number of access operations which is therefore time-consuming. It will be appreciated since none of the cache lines 302, 304, 306, 308 may be spatially proximal, and since the first value p has not been prefetched, there may be no mechanism by which any of the other values may have been prefetched. Hence, in certain situations such as linked lists, there could be a long period of time required in order to traverse the list.

Figure 3C:
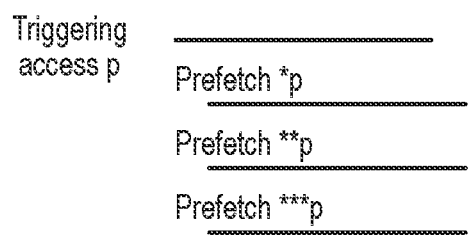

FIG. 3C is a timeline that shows the time taken for each of the data values p, *p, p, *p to be handled in a situation in which the prefetch circuitry 42 contains the correlation information shown in FIG. 2. Specifically, the correlation information storage 82 contains an entry for which p is a trigger data item and *p, p, *p are identified as correlated data items. This may come to be the case following the situation shown in FIG. 3B in which the cache misses occurred and so the prefetch circuitry 42 added, as a new entry to the correlation information storage 82, the correlated data items *p, p, *p in association with trigger data item p. Thus, when an access is made to the data item p, a data fill for p occurs (assuming that p was not already present in the cache 22). In addition to filling p, the prefetch circuitry 42 identifies that the access request for p matches the trigger data item p in the correlation information storage 82. As such, the prefetch circuitry 42 prefetches the correlated data items *p, p, *p in anticipation that these data items will be requested by the processing circuitry 10. Hence, once the pointer p has been analysed and identified as a pointer, *p is requested. In this case, *p is already present in the L1 data cache 22 and so this request can be fulfilled without having to request the data from a lower level of the cache hierarchy. Similarly, p and *p when requested by the processing circuitry can be provided straight away without having to first be obtained from lower levels of the hierarchy. As such, with the prefetch circuitry 42 operating as described, the time taken to traverse the linked list is reduced, thereby improving the performance of the processing circuitry 10.

Figure 4A:
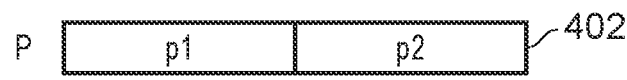
FIGS. 4A-4C show a worked example in which correlation information is associated with a particular data item of an entry.
Figure 4B:
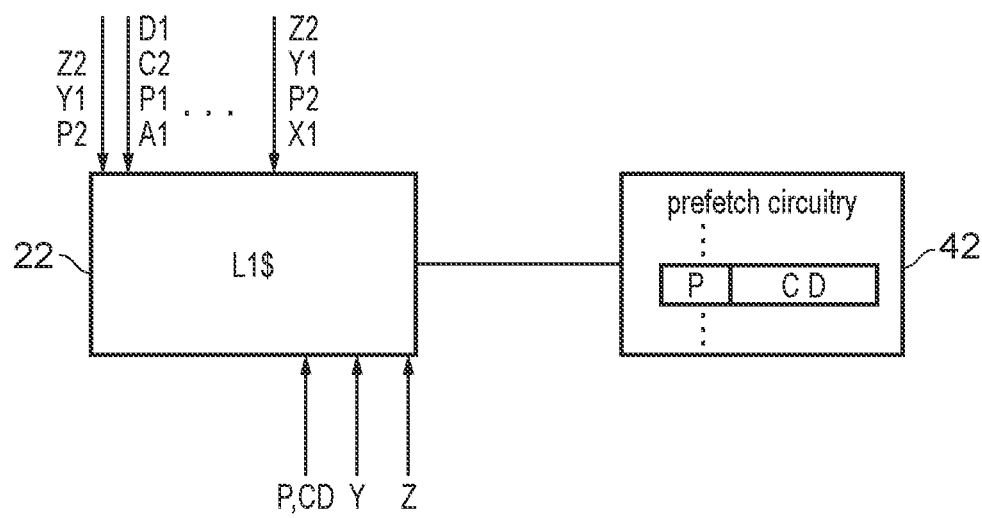
Figure 4C:
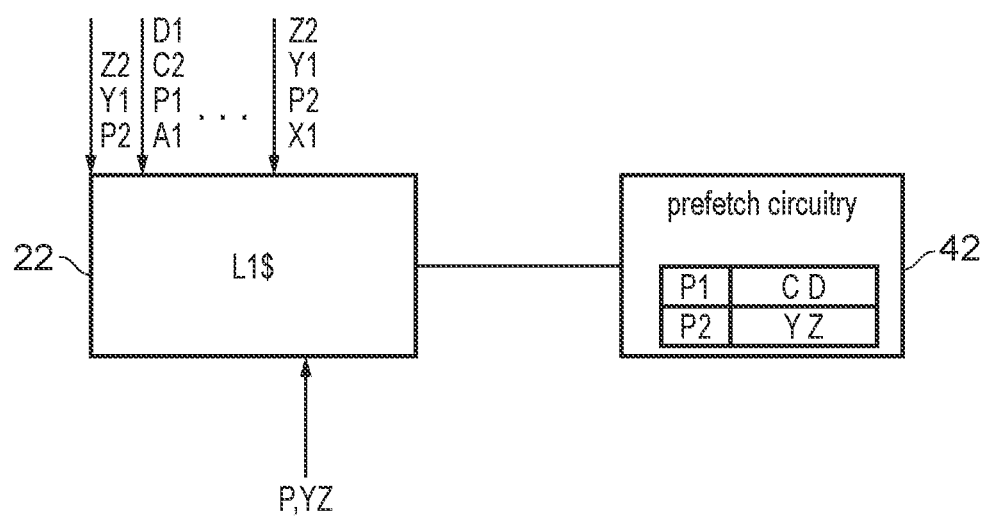

FIGS. 4A-4C show a worked example in which correlation information is associated with a particular data item of an entry. FIG. 4 shows the contents of a cache line 402 containing two data words p1 and p2. p1 and p2 represent separate pieces of data that can be independently addressed and accessed.

FIG. 4B shows an example in which an L1 cache 22 operates in in conjunction with prefetch circuitry 42 that maintains correlation information that does not distinguish between which data item of the cache line was accessed. As such, in response to the series of accesses shown in FIG. 4B (occurring in sequence bottom-to-top then left-to-right), the prefetch circuitry initially reacts to a cache miss occurring as a result of an access request for p2, by storing correlation information identifying the correlated data items accessed after p2. Thus, the prefetch circuitry 42 stores as a trigger data item, p, and as correlated data items, Y and Z.

However, this correlation information is overwritten in response to the sequence A1, p1, C2, D1 as the prefetch circuitry 42 does not distinguish between the accesses p1 and p2. As such, based on observing the sequence p1, C2, D1, the correlation information storage is overwritten with P as a trigger data item, and C and D as correlated data items.

Thus, when the initial sequence p2, Y1, Z2 is encountered again later, on detecting the access p2 as an access to the cache line P (but without distinguishing which data item of the cache line is being accessed), the prefetch circuitry 42 triggers a prefetch of the data items C and D, as shown at the bottom of FIG. 4B. However, these are not the data items that are subsequently requested by the processing circuitry 10. Instead, the sequence involving p2 is repeated and so the subsequent data items requested are Y1 and Z2. These data items were not prefetched since the correlation information identifying these data items was overwritten. Hence, a delay in providing access to Y1 and Z2 is introduced since whilst these data items are fetched from a lower level in the hierarchy.

FIG. 4C illustrates the same sequence of access requests to the L1 cache 22, however, in this case, the prefetch circuitry 42 maintains correlation information that identifies to which data item of a cache line the trigger data item relates. Thus, upon observing the sequence of accesses, p2, Y1, Z2 the prefetch circuitry 42 adds an entry to the correlation information identifying the data item p1 specifically as the trigger data item, in response to which the correlated data items Y and Z should be fetched. When the sequence involving p1, C2, and D1 is then observed, a separate entry in the correlation information is added with p1 as the trigger data item and C and D as correlated data items.

Therefore, when the sequence p2, Y1, Z2 is encountered again, upon detecting the access request to p2, the correct sequence is identified in the correlation information by the prefetch circuitry 42 and the subsequent accesses to cache lines Y and Z correctly predicted with those cache lines prefetched. Hence, when this sequence is encountered again, the cache lines Y and Z can be prefetched into the cache 22 thereby reducing the latency in fulfilling the access requests for Y1 and Z2. Thus, it can be seen that by identifying to which data item of a cache line a trigger data item in the correlation information relates, the prefetch circuitry 42 can be made to operate more accurately and thereby reduce the time taken for the access requests to be fulfilled.

Figure 5:
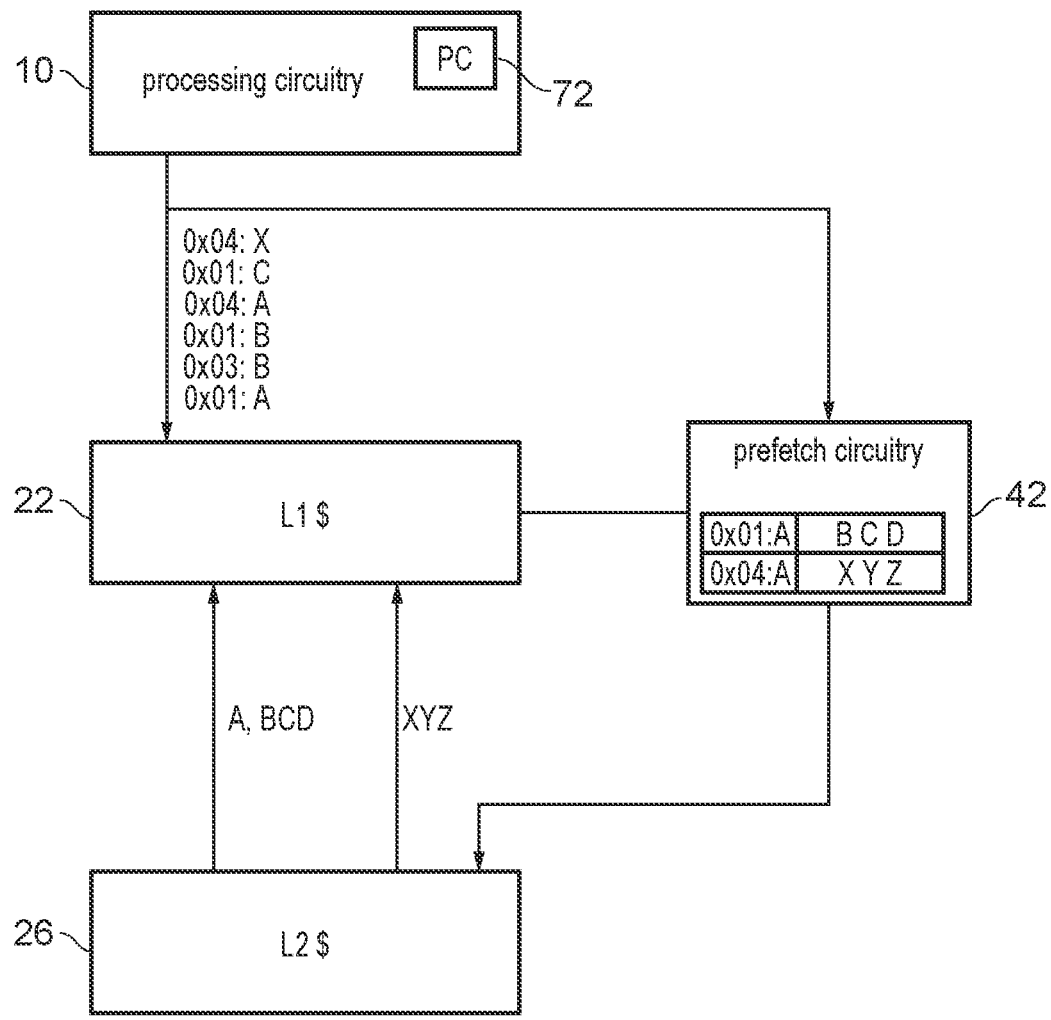
FIG. 5 shows a worked example in which correlation information is associated with a particular program counter value.

FIG. 5 shows a worked example in which correlation information is associated with a particular program counter value. As with the example of FIG. 4, a sequence of access requests from the processing circuitry 10 to the L1 cache 22 is illustrated and the corresponding fetches and prefetches are shown from the L2 cache 26. As shown in FIG. 5, the program counter value representing the value of the program counter stored in the program counter register 72 is also specified in the access request.

The prefetch circuitry 42 has access to correlation information which specifies both an address of a trigger data item, (which in this case is A for both items of correlation information) and an associated program counter value (0x01 and 0x04 respectively). This correlation information may be based on previously observed patterns of accesses in which it was observed that a different sequence of accesses followed the trigger item A depending on whether the instruction that led to the access request had a program counter value of 0x01 or 0x04.

Thus, in response to the detecting the access request for data item A triggered by an instruction associated with program counter value 0x01, in addition to fetching the data item A which has missed in the cache 22, the prefetch circuitry 42 is configured to reference the correlation information storage, identify that correlation information is stored for the combination of the data item A and program counter value 0x01 and therefore trigger a prefetch of the correlated data items B, C, and D. The next access requests having the same program counter value 0x01 are to B and C and so the prefetch circuitry 42 has correctly prefetched the next data items in this sequence. This sequence may correspond to a loop and hence it would be expected that the same instruction may lead to access requests going through a sequence in this way and thus that the program counter value will be correlated with that particular sequence.

However, upon encountering an access request to the same data item A but triggered by an instruction having a different program counter value 0x04, a different set of data items X, Y, and Z are prefetched. Thus, a different sequence of accesses is recognised and prefetched based on the different program counter value. Thus, by additionally basing the data items to be prefetched on the program counter value of the access request triggering the prefetch, the accuracy of the prefetching can be further improved.

Figure 6:
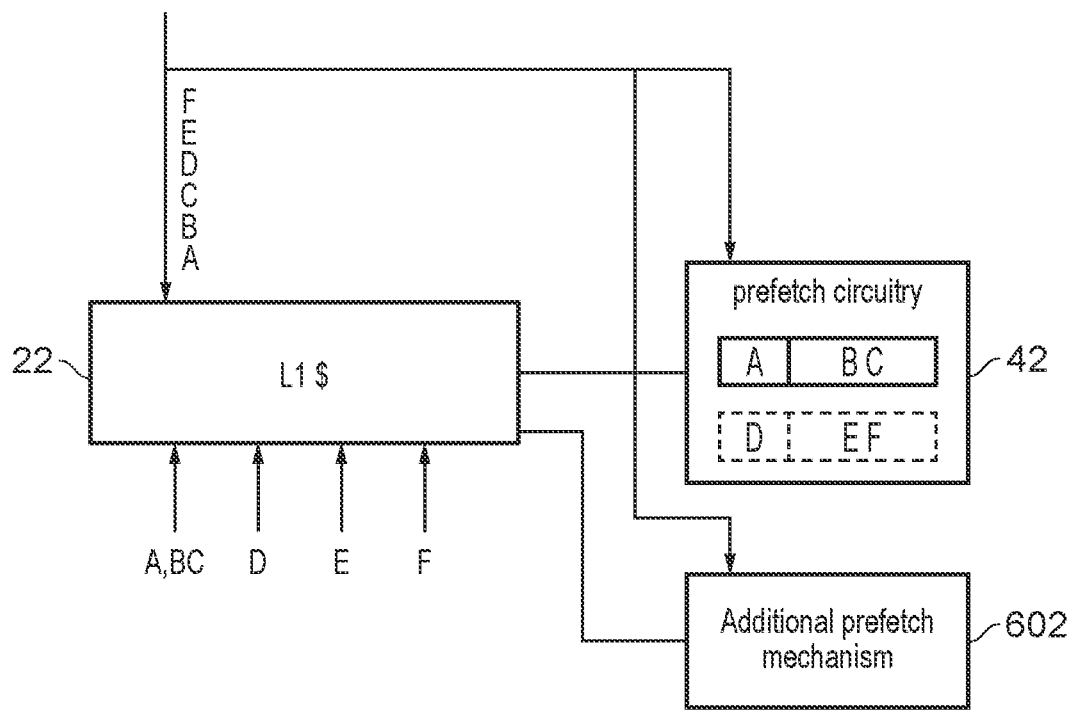
FIG. 6 shows a worked example in which a new correlation entry is added to the correlation information storage.

FIG. 6 shows a worked example in which a new correlation entry is added to the correlation information storage. As illustrated, a sequence of accesses are made to the L1 cache 22. The prefetch circuitry 42 initially has access to correlation information having an entry with a trigger data item A and two correlated data items, B and C. Thus, in response to an access request identifying data item A, the prefetch circuitry 42 prefetches data B and C as illustrated in FIG. 6.

However, initially there is no correlation information for any of data items D, E, and F. As such, when access requests directed to D, E, and F are encountered and these data items are not present in the L1 cache 22, individual fill operations have to be performed for each access request. Based on detecting the misses in the cache, the prefetch circuitry 42 is configured to add an additional correlation information entry to the correlation information. The correlation information entry identifies D as the trigger data item and E and F as correlated data items to be prefetched when D is encountered. Thus, the correlation information can be updated based on the access requests encountered, thereby improving the accuracy of prefetching for repeated sequences of accesses.

As shown in FIG. 6, there is also provided an additional prefetch mechanism 602 such as a stride prefetcher or a stream buffer prefetcher. To avoid filling up the correlation information storage with correlation information for prefetching workloads that could be correctly prefetched by another prefetch mechanism that does not require correlation information to be stored, the prefetch circuitry 42 is arranged to determine whether the additional prefetch mechanism 602, or if any of a plurality of additional prefetch mechanisms provided, could be used to correctly prefetch the workload identified by the prefetch circuitry 42. If this is the case, then the prefetch circuitry 42 suppresses the addition of the new correlation information, instead relying on that additional prefetch mechanism 602 to prefetch the data items in the sequence if that sequence is encountered again.

Figure 7:
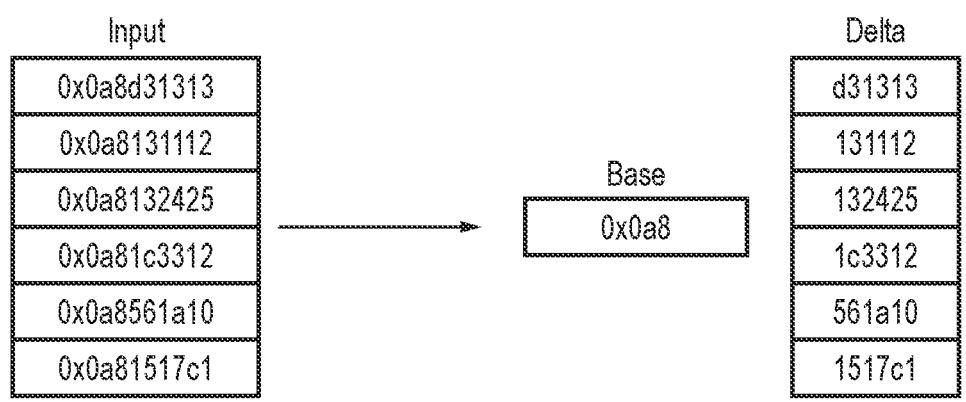
FIG. 7 shows an example of compression of addresses.

FIG. 7 illustrates an example of how compression can be used in order to compress the correlated data items stored in the correlation information storage. In this example, a number of input addresses are provided. Each of the input addresses contains a number of prefixed common bits. In this example, the common bits are '0x0a8'. Consequently, by extracting these bits and by expressing them as a base address, it is possible to express the remaining addresses as a series of delta values. In this example, decompression can take place by simply concatenating the base address with each of the deltas.

In other embodiments, the delta could be derived from a target address by performing a subtraction between the base address and the target address. Decompression could then take place by performing an addition of the delta to the base address. Other techniques will be known to the skilled person.

In some embodiments, each entry in the correlation information storage could specify the degree of compression provided. In particular, a number of different compression levels could be provided that indicate the number of bits that make up the base address. For instance, level one compression could correspond to two bits being used to make up the base address. Level two compression could be used to indicate four bits being used to the base address, level three with six bits and level four with eight bits. The compression level would be set to the highest that is possible for a set of correlated addresses. For instance, if all the correlated addresses only had six common prefixed bits, then the compression level would be set to three (six bits). Similarly, if all of the input addresses had seven bits in common, then a compression level of four would not be appropriate since this would include non-common-bits in the base address. The level would therefore be set to three. In this way, each entry in the correlation information storage can use a different level of compression, as appropriate. This allows for maximum compression in some cases, while also allowing addresses that are highly dissimilar (or far removed from each other) to form part of the same correlation and thereby be stored in the same correlation information storage.

Figure 8:
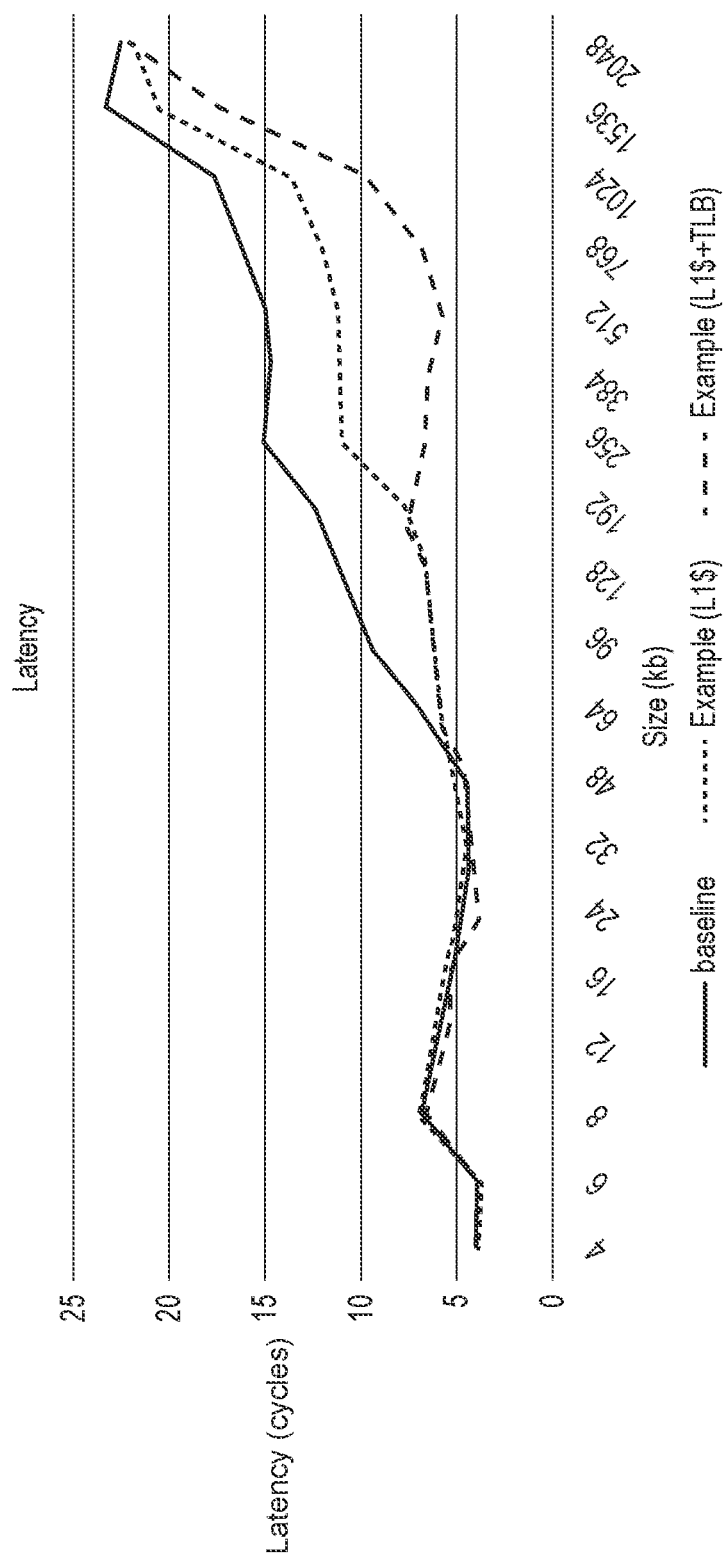
FIG. 8 shows an example analysis of the present techniques.

FIG. 8 shows a graph and illustrates an example analysis of the present technique and particularly the latency of an L1 cache for different cache sizes. In particular, the graph shows that up until a cache size of around 64 kB, the latency of the present technique approximately mirrors the latency of previously proposed examples. However, whereas in previous techniques, an increase in cache size beyond 64 kB has caused a sharp increase in latency, the present technique continues to provide a lower latency. For cache sizes of around 192 kB this analysis applies both where the present technique is applied only to the L1 cache and where the technique is applied to both the L1 cache and the prefetch circuitry is used to trigger a prefetch of translation entries into the TLB as described in more detail above. Beyond a cache size of 192 kB however, there is an additional latency improvement associated with prefetching translation entries into the TLB as well as prefetching the data into the L1 cache.

Clearly, it will be appreciated by the skilled person that FIG. 8 illustrates the improvements achieved in one example implementation and the improvement in other implementations may for example be greater.

Figure 9A:
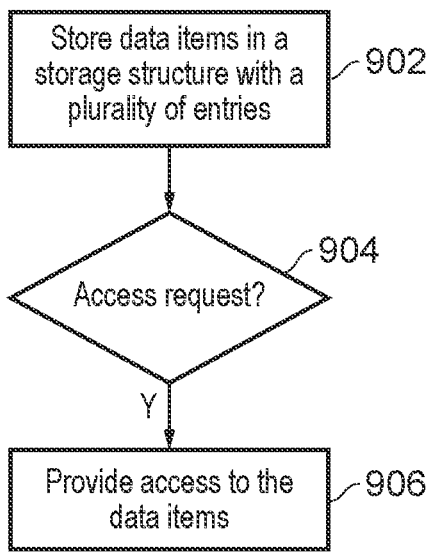
FIGS. 9A-9B are flowcharts showing methods performed by the storage structure, prefetch circuitry, and correlation information storage.

FIG. 9A is a flowchart showing a method performed by a storage structure according to an example. The storage structure may for example be a cache such as caches 22, 24, 26 or may be branch predictor storage 28, translation lookaside buffer 30 or correlation information storage 82, 84, 84. At step 902, data is stored in the storage structure, the storage structure having a plurality of entries to store data. It will be recognised that the type of data stored will be dependent on the form of the storage structure. In response to an access request, as indicated by step 904, access is provided to the data items in the storage structure at step 906. This may for example involve providing the data to the processing circuitry 10 or writing data from the processing circuitry 10 to the storage structure.

Figure 9B:
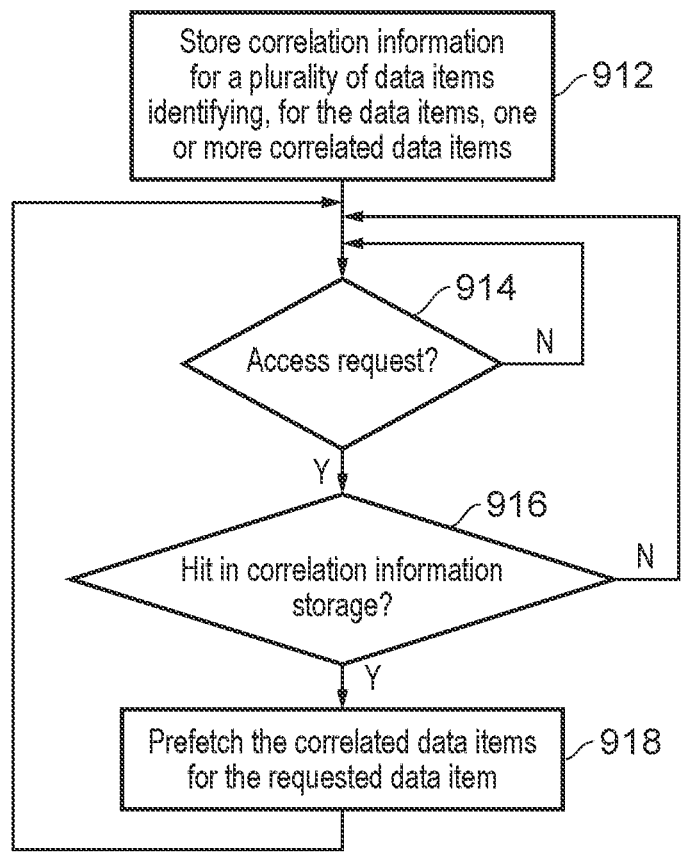

FIG. 9B is a flowchart illustrating a method performed by prefetch circuitry 42, 44, 46 and correlation information storage 82, 84, 86. At step 912 it is depicted that correlation information for a plurality of data items is stored in the correlation information storage, the correlation information identifying, for the data items, one or more correlated data items. In response to an access request from the processing circuitry 10 as depicted at step 914, the prefetch circuitry references the correlation information storage to determine whether correlation information is stored corresponding to the access request at step 916. This determination may involve a comparison based on an address of the access request and/or a program counter value associated with an instruction that triggered the access request. If a hit is detected in the correlation information storage, then at step 918, the prefetch circuitry prefetches the correlated data items associated with the requested data item identified by the access request. Thus, these data are available in the storage structure for access by subsequent access requests specifying the prefetched data items.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a storage structure comprising a plurality of entries to store data items, wherein the storage structure is responsive to access requests from processing circuitry to provide access to the data items;
wherein the storage structure is arranged to store two or more data items in an entry and the storage structure is responsive to the access requests specifying an address indicating a particular data item of an entry to which the access requests are directed;
prefetch circuitry to prefetch data; and
correlation information storage to store correlation information for a plurality of data items, wherein for each of the plurality of data items the correlation information is stored in association with a trigger address which identifies to which data item of an entry the correlation information associated with that trigger address relates and wherein the correlation information identifies one or more correlated data items;
wherein the prefetch circuitry is configured to:
monitor the access requests from the processing circuitry; and
in response to detecting a hit in the correlation information storage for a particular access request that identifies a requested data item for which the correlation information storage stores correlation information, prefetch the one or more correlated data items identified by the correlation information for the requested data item;
wherein the prefetch circuitry is configured to detect the hit in response to detecting a match in a comparison based on an address of the requested data item identified by the particular access request and the trigger address of correlation information for a data item.

2. The apparatus according to claim 1, wherein:
the correlation information storage is arranged to store correlation information tagged by a program counter value; and
the prefetch circuitry is configured to detect a hit in response to determining that the particular data item corresponds to the data item for which the correlation information storage stores correlation information and detecting a match in a comparison based on a value of the program counter for an instruction that triggered the particular access request and a program counter value of correlation information for a data item.

3. The apparatus according to claim 1, wherein:
the correlation information storage is arranged to store correlation information tagged by a program counter value; and
the prefetch circuitry is configured to detect a hit in response to detecting a match in a comparison based on a value of a program counter for an instruction that triggered the particular access request and a program counter value of correlation information for a data item.

4. The apparatus according to claim 1, wherein:
the prefetch circuitry is configured to prefetch the data into the storage structure; and
prefetching the one or more correlated data items comprises prefetching the one or more correlated data items into the storage structure.

5. The apparatus according to claim 1, wherein:
the apparatus comprises a second storage structure;
the prefetch circuitry is configured to prefetch the data into the second storage structure; and prefetching the one or more correlated data items comprises prefetching the one or more correlated data items into the second storage structure.

6. The apparatus according to claim 5, wherein:
the storage structure is a level 1 (L1) cache responsive to access requests received directly from the processing circuitry; and
the second storage structure is a level 2 (L2) cache responsive to access requests received from the L1 cache.

7. The apparatus according to claim 1, wherein:
the apparatus further comprises a translation lookaside buffer (TLB) to store address translation data;
the storage structure is responsive to access requests specifying a virtual address of the data;
in response to detecting the hit in the correlation information storage, the prefetch circuitry is configured to prefetch the one or more correlated data items into the storage structure and to prefetch into the TLB one or more translation entries for performing address translation for the one or more correlated data items.

8. The apparatus according to claim 1, wherein:
the storage structure is a level 1 (L1) cache responsive to access requests received directly from the processing circuitry;
each of the plurality of entries is a cache line; and
the prefetch circuitry is configured to prefetch into the storage structure, in response to detecting the hit in the correlation information storage, one or more cache lines identified by the correlation information for the requested data item.

9. The apparatus according to claim 1, wherein:
the correlation information storage is arranged to store correlation information identifying for each of the plurality of data items, a plurality of correlated data items; and
the prefetch circuitry is configured to prefetch, in response to detecting the hit in the correlation information storage, the plurality of data items into the storage structure.

10. The apparatus according to claim 1, wherein:
the prefetch circuitry is configured to apply a filter to the access requests from the processing circuitry and monitor only the access requests that pass the filter.

11. The apparatus according to claim 1, wherein:
the prefetch circuitry is responsive to a missing access request, for which a specified data item is absent from the storage structure, to add a new correlation entry for the specified data item to the correlation information, the new correlation entry associated with the missing access request and identifying, as correlated data items, one or more subsequent data items accessed following the missing access request.

12. The apparatus according to claim 11, wherein:
the prefetch circuitry comprises one or more additional prefetch mechanisms; and
the prefetch circuitry is configured to suppress the addition of the new correlation entry for the specified data item to the correlation information in response to determining that the one or more additional prefetch mechanisms are capable of prefetching the one or more subsequent data items.

13. The apparatus according to claim 11, wherein:
the prefetch circuitry is configured to compress an indication of correlated data items prior to adding the new correlation entry to the correlation information.

14. The apparatus according to claim 13, wherein:
the prefetch circuitry is configured to compress the indication of correlated data items by storing a base address and, for each correlated data item, a delta between the base address and an address of a correlated data item.

15. The apparatus according to claim 1, wherein:
the apparatus comprises correlation information storage circuitry to implement the correlation information storage.

16. The apparatus according to claim 1, wherein:
the storage structure is adapted to treat one or more of the plurality of entries of the storage structure as correlation storage entries to store the correlation information.

17. A method of managing a storage structure:
storing data items in the storage structure, the storage structure comprising a plurality of entries, wherein the storage structure is arranged to store two or more data items in an entry;
providing access to the data items in response to access requests from processing circuitry wherein the storage structure is responsive to the access requests specifying an address indicating a particular data item of an entry to which the access requests are directed;
storing correlation information for a plurality of data items in correlation information storage, wherein for each of the plurality of data items the correlation information is stored in association with a trigger address which identifies to which data item of an entry the correlation information associated with that trigger address relates and wherein the correlation information identifies one or more correlated data items;
monitoring the access requests from the processing circuitry;
in response to detecting a hit in the correlation information storage for a particular access request that identifies a requested data item for which the correlation information storage stores correlation information, prefetching the one or more correlated data items identified by the correlation information for the requested data item;
wherein the hit is detected in response to detecting a match in a comparison based on an address of the requested data item identified by the particular access request and the trigger address of correlation information for a data item.

18. A non-transitory computer-readable medium to store computer-readable code for fabrication of an apparatus comprising:
a storage structure comprising a plurality of entries to store data items, wherein the storage structure is responsive to access requests from processing circuitry to provide access to the data items;
wherein the storage structure is arranged to store two or more data items in an entry and the storage structure is responsive to the access requests specifying an address indicating a particular data item of an entry to which the access requests are directed;
prefetch circuitry to prefetch data; and
correlation information storage to store correlation information for a plurality of data items, wherein for each of the plurality of data items the correlation information is stored in association with a trigger address which identifies to which data item of an entry the correlation information associated with that trigger address relates and wherein the correlation information identifies one or more correlated data items;

wherein the prefetch circuitry is configured to:
  monitor the access requests from the processing circuitry; and
  in response to detecting a hit in the correlation information storage for a particular access request that identifies a requested data item for which the correlation information storage stores correlation information, prefetch the one or more correlated data items identified by the correlation information for the requested data item;
wherein the prefetch circuitry is configured to detect the hit in response to detecting a match in a comparison based on an address of the requested data item identified by the particular access request and the trigger address of correlation information for a data item.

* * * * *